B. H. SCHROER.
TRAP.
APPLICATION FILED APR. 19, 1909.

964,060.

Patented July 12, 1910.

Witnesses

Inventor
Benard H. Schroer.
By
Attorney

UNITED STATES PATENT OFFICE.

BENARD H. SCHROER, OF OAKDALE, ILLINOIS.

TRAP.

964,060.  Specification of Letters Patent.  Patented July 12, 1910.

Application filed April 19, 1909. Serial No. 490,857.

*To all whom it may concern:*

Be it known that I, BENARD H. SCHROER, a citizen of the United States, residing at Oakdale, in the county of Washington, State of Illinois, have invented certain new and useful Improvements in Traps; and I do hereby declare the following to be a full, clear, and exact description of the invention, such as will enable others skilled in the art to which it appertains to make and use the same.

This invention relates to animal traps and its principal object is to improve the general construction of traps of this character so that the trap may be simple in its details and economically manufactured.

With the above and other objects in view as will be hereinafter apparent the invention consists in general of an outer casing or cage provided with a door opening, a closure for the door opening, and novel means of setting and operating the closure.

The invention further consists in certain novel details of construction and combinations of parts hereinafter fully described, illustrated in the accompanying drawings, and specifically set forth in the claims.

Figure 1:
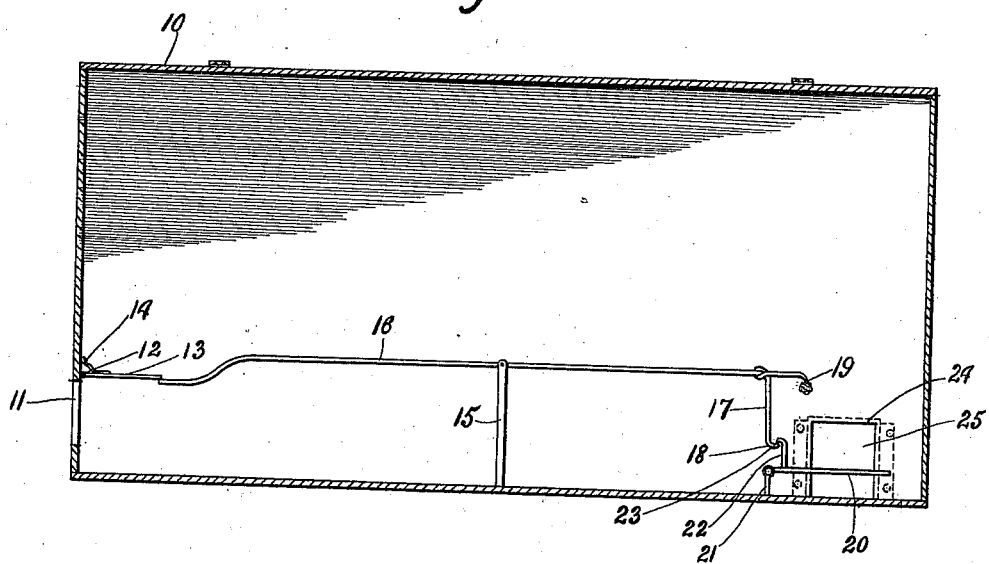
Figure 2:
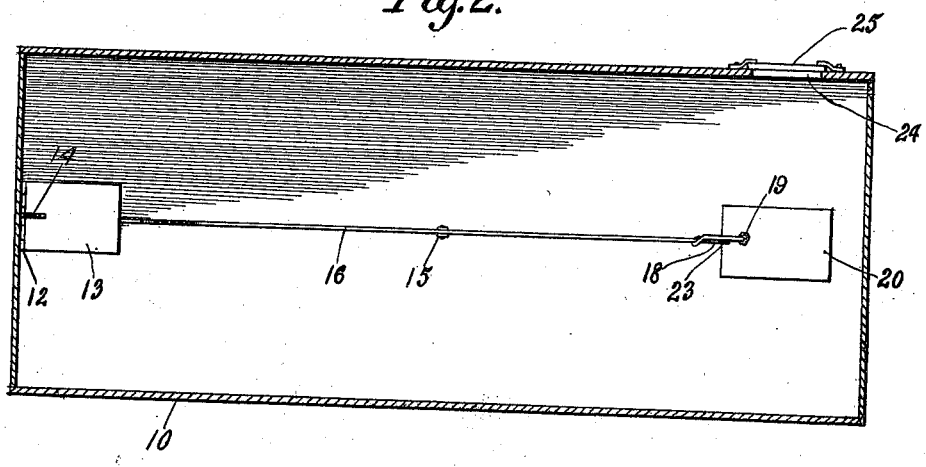

In the accompanying drawings, like characters of reference indicate like parts in the several views, and:—Figure 1 is a vertical longitudinal section showing the invention. Fig. 2 is a horizontal section showing the operating parts in plan.

The numeral 10 indicates the outer casing or cage and this outer casing is provided at the front end with a door 11. Above this door opening is a hinge 12 whereto is attached by one edge a closure 13 which, when the trap is shut drops over the opening 11. A spring 14 is also provided to assist the action of gravity in closing the closure 13.

At 15 is a standard whereon is pivotally mounted a lever 16 the forward arm of which is arranged to extend beneath the free edge of the closure 13 when the trap is set. The other arm of this lever 16 extends rearwardly of the support 15 and is downwardly bent as at 17 being provided at its lower end with a catch comprising a laterally bent portion 18. The lever 16 carries beyond the member 17, a bait support 19.

A platform 20 is located to the rear of the casing 10 being supported in spaced relation to the floors in casing by a standard 21 whereto one edge of the platform 20 is hinged. This platform 20 is arranged to lie below the bait support 19 and is further provided with a trigger comprising an upstanding portion 22 having a laterally bent end 23 which, when the trap is set engages with the portion 18 of the member 17.

For the purpose of removing the captured rat from the trap there is provided a suitable opening 24 having a sliding closure 25 normally held over the opening 24.

In the operation of this invention the closure 13 is raised and caught over the end of the lever 16. The platform 20 is then lifted so that the trigger 23 engages the catch 18. The bait support 19 is armed with suitable bait. The trap is now set ready for use and when a rat or other animal enters the trap it will be attracted by the bait and in order to reach the latter will mount the platform 20. The weight of the animal will act to disengage the trigger 23 from the member 18 and the lever 16 will be depressed at its forward end by the action of the spring 14 assisted by gravity. The closure 13 will thus be freed from the lever 16 and permitted to drop across the opening 11 thus securely closing the trap.

There has thus been provided a simple and efficient device of the character described and for the purpose specified.

It is obvious that minor changes may be made in the form and construction of this invention without departing from the material principles thereof. It is not therefore desired to confine the invention to the exact form herein shown and described, but it is wished to include all such as properly come within the scope of the appended claims.

Having thus described the invention, what is claimed as new is:—

1. In an animal trap, a door provided casing, a closure for said door hinged at its upper edge above the door, a pivotally mounted lever provided with an end engaging the free end of said closure when the trap is set, a catch member projecting downward from said lever and provided with a laterally bent end, a platform hinged at one end above the bottom of the casing, an upwardly extending trigger fixed to the platform and provided with an end engaging the laterally bent end of the catch when the trap is set, said platform being depressed to disengage the trigger and catch when pressed by the weight of an animal, and a bait support located above said platform.

2. In an animal trap, a casing having a door opening at one end thereof, a closure for said door opening hinged within the casing immediately above said door opening, a spring normally urging said closure to its closed position, a standard mounted on the floor of said casing and extending upward therefrom, a lever pivoted intermediate its ends to said standard, one end of said lever being arranged to engage beneath the free edge of said closure when the latter is opened, the other end of said lever being downwardly bent and terminating in an angled portion to form a catch, a second standard immediately beneath the downwardly bent end of the lever, a platform hinged at one edge to said second standard, a trigger carried on said platform and provided with an angled end arranged to engage said catch, and a bait support immediately above said platform.

In testimony whereof, I affix my signature, in presence of two witnesses.

BENARD H. SCHROER.

Witnesses:
  WM. H. KRUSE,
  BERNARD LEHMKUHL.